United States Patent [19]

Hartley

[11] Patent Number: 5,396,531
[45] Date of Patent: Mar. 7, 1995

[54] METHOD OF ACHIEVING REDUCED DOSE X-RAY FLUOROSCOPY BY EMPLOYING STATISTICAL ESTIMATION OF POISSON NOISE

[75] Inventor: Richard I. Hartley, Schenectady, N.Y.

[73] Assignee: General Electric Company, Schenectady, N.Y.

[21] Appl. No.: 971,652

[22] Filed: Nov. 5, 1992

[51] Int. Cl.⁶ .............................................. H05G 1/46
[52] U.S. Cl. ..................... 378/108; 378/97; 364/413.13
[58] Field of Search ................ 378/96, 97, 98.2, 108, 378/109, 110, 111, 112; 364/413.13, 413.14, 413.15

[56] References Cited

U.S. PATENT DOCUMENTS

| 4,260,894 | 4/1981 | Neumann | 378/16 |
| 5,179,582 | 1/1993 | Kelley et al. | 378/96 |
| 5,224,141 | 6/1993 | Yassa et al. | 378/98.2 |
| 5,253,169 | 10/1993 | Corby, Jr. | 364/413.13 |
| 5,278,887 | 1/1994 | Chiu et al. | 378/156 |
| 5,293,415 | 3/1994 | Hartley et al. | 378/108 |
| 5,319,696 | 6/1994 | Abdel-Maleh et al. | 378/108 |

OTHER PUBLICATIONS

"Imaging Systems for Medical Diagnostics", by Krestel, Aktiengesellschaft, Berlin and Munich, pp. 103–107.

"Medical Imaging Systems" by Macovski, 1983 Prentice–Hall, Englewood Cliffs, N.J. 07632, pp. 23–35.

"Effect of Pulsed Progressive Fluoroscopy on Reduction of Radiation Dose in the Cardiac Catherizaion Laboratory", by Holmes, Wondrow, Gray, Vetter, Fellows and Julsrud, Journal. American College of Cardiology, vol. 15, No. 1, pp. 159–162.

"Fundamentals of Digital Image Processing", by Jain, Prentice–Hall (1989) pp. 132–188.

"Numerical Recipes in C", by Press, Flannery, Teukolsky and Veterling, Cambridge University Press, Cambridge, England (1988) pp. 517–539.

Primary Examiner—Paul M. Dzierzynski
Assistant Examiner—David V. Bruce
Attorney, Agent, or Firm—Lawrence P. Zale; Marvin Snyder

[57] ABSTRACT

An interactive system for producing X-ray fluoroscopic images determines X-ray tube photon count and voltage for producing acceptable quality images while minimizing X-ray radiation dosage to a subject. An image is created and a signal to noise (S/N) ratio is estimated from the image, assuming a Poisson model is assumed for the X-ray image. The S/N ratio is determined by solving several simultaneous equations and the photon count is estimated to produce an image with a desired S/N ratio. Subsequent X-ray fluoroscopy images are produced with the optimum photon count Q, thereby reducing X-ray dosage. The optimization is repeated periodically to readjust the system.

3 Claims, 14 Drawing Sheets

METHOD OF ACHIEVING REDUCED DOSE X-RAY FLUOROSCOPY BY EMPLOYING STATISTICAL ESTIMATION OF POISSON NOISE

CROSS REFERENCES TO RELATED APPLICATIONS

This application is related to U.S. patent application X-Ray Dose Reduction in Pulsed Systems by Adaptive X-Ray Pulse Adjustment Ser. No. U.S. Pat. No. 5,319,696 issued Jun. 7, 1994 "X-Ray Dose Reduction in Pulsed Systems by Adaptive X-Ray Pulse Adjustment" by A. Abdel-Malek, S. Roehm, J. Bloomer by Aiman A. Abdel-Malek, Steven P. Roehm and John J. Bloomer, X-Ray Fluoroscopy System For Reducing Dosage Employing Iterative Power Ratio Estimation Ser. No. 07/956,203, filed Nov. 5, 1992, now U.S. Pat. No. 5,293,415 by Richard I. Hartley, Aiman A. Abdel-Malek and John J. Bloomer and Reduced Dose X-ray Fluoroscopy System Employing Transform-based Estimation of Poisson Noise Ser. No. 07/971,651filed Nov. 5, 1992, now allowed, by Richard Ian Hartley all assigned to the present assignee, hereby incorporated by reference.

BACKGROUND OF THE INVENTION

1. Field of the Invention.

This invention relates to fluoroscopic imaging and more specifically to reduction in patient X-ray dosage during imaging.

2. Description Of Related Art

An X-ray procedure, known as fluoroscopy, creates a series of internal images of a subject. Conventional pulsed systems produce each image by transmitting an X-ray pulse or other ionizing radiation from one side of the subject and detecting the transmitted radiation or shadow at an opposite side of the subject. The intensity of an X-ray radiation beam can be described by the following equation:

$$J = \int J_0(E) e^{-\int \mu(x,E)dx} dE$$

from p. 103 of *Imaging Systems for Medical Diagnostics* by Erich Krestel, Siemens Aktiengesellschaft, Berlin and Munich, where E is the quantum energy of the X-ray photons, $J_0(E)$ is the intensity at energy E of an incident X-ray beam, $\mu(x,E)$ is the linear attenuation constant which changes along a direction of the ray x, and $\mu(x,E)$ changes with photon energy E.

Different tissues exhibit different linear attenuation as a function of X-ray photon energy E, thereby exhibiting different X-ray beam intensities J after transmission through the tissue. Adjusting the X-ray photon energy, therefore, can change the relative X-ray beam intensifies as they pass through different tissue types, leading to increased contrast in an image.

The difference in intensity between the incident X-ray radiation $J_0$ and the transmitted intensity J is proportional to the dose absorbed by the subject being imaged. Compton scattering and photoelectric absorption account for the majority of the energy absorbed by the subject in the spectrum used for conventional X-ray imaging as described on p. 27 of *Medical Imaging Systems* by Albert Macovski, 1983 Prentice-Hall, Engelwood Cliffs, N.J. 07632.

In fluoroscopic systems, the radiation is pulsed at a rate to produce a continuous sequence of images, causing the dosage to become quite large. Fluoroscopy is commonly used in order to position a catheter or similar invasive device inside a subject. Since these procedures may take a long time, the acquired radiation accumulates to a large total dose. A primary goal of diagnostic and interventional X-ray fluoroscopic procedures is to provide an accurate diagnosis while reducing the dose received by the subject and medical staff.

Attempts have been made to reduce dose absorbed by the subject and medical staff during fluoroscopic procedures. These attempts can be classified into three categories:

(1) mechanical redesign of elements of an X-ray system such as the X-ray grid, grid cover, scintillator, table top, cassette front etc. to reduce scattering;

(2) the use of protective gear (e.g., gloves and glasses, although the use of lead gloves hampers the ability to perform the fine movements necessary for catheter placement ); and (3) control of X-ray tube parameters.

The X-ray tube parameters that may be varied to reduce X-ray dosage include the following:

a) the X-ray tube voltage, which affects the photon energy of the X-rays;

b) the filament current $I_{fil}$, which affects the rate of emission of X-ray photons;

c) the pulse duration T; and d) the pulse rate.

Reduction of the filament current or the pulse duration has the effect of decreasing the exposure in each frame but at the cost of diminished image quality. The image quality is dependent on the total photon count per unit area, referred to herein as "photon count". The photon count is equal to the product of the photon rate (determined by filament current $I_{fil}$) and the pulse duration T.

Pulse duration T has been reduced to limit the radiation dose as described in *Effect of Pulsed Progressive Fluoroscopy on Reduction of Radiation Dose in the Cardiac Catheterization Laboratory*, by D. Holmes, M. Wondrow, J. Gray, R. Vetter, J. Fellows, and P. Julsrud, Journal American College of Cardiology, vol. 15, no. 1, pp. 159-162, January 1990 and hereby incorporated by reference.

Imaging by reduced pulse rate has the advantage of maintaining the important diagnostic signal at its original high contrast level for a given dosage, but does not collect as many frames. However, the fixed rate reduction methods produce visible jerky motion artifacts. These artifacts may also introduce time delays between a physician's actions and viewed results (e.g., moving a catheter or injecting radio-opaque dye).

A technique for imaging using reduced pulse rates triggered by the subject's organ activity was disclosed in U.S. patent application "Fluoroscopic Method with Reduced X-Ray Dosage" Ser. No. 07/810,341 by Fathy F. Yassa, Aiman A. Abdel-Malek, John J. Bloomer, Chukka Srinivas filed Dec. 9, 1991 assigned to the present assignee and hereby incorporated by reference. Although this technique reduces dosage by reducing the pulse rate, it does not adjust the power transmitted by the X-ray source which may further reduce dose.

Incorrectly reducing the power transmitted by the X-ray source may lead to poor quality images with reduced diagnostic content—the image may be characterized by global graininess and low contrast about important features such as the catheter, balloon, vessel boundaries, etc. Attempts to improve signal-to-noise (S/N) ratio via noise reduction filters affect the overall image quality by averaging-out the noise contribution and result in the image being of questionable value since the diagnostic information is less exact at lower doses than at higher doses.

The X-ray tube voltage and current necessary to produce a high quality image also depend on the area of the body under study. It is well known that different tissue types attenuate X-rays differently. For example bone is quite dense, requiring high-energy X-ray photons for penetration, while fat is quite transparent to high-energy photons. Fat requires lower-energy X-rays to retrieve an image with good definition of the embedded features (e.g., contrast).

Since conventional fluoroscopy systems may incorrectly calculate X-ray tube voltage and photon count, subjects may be exposed to more radiation than is necessary, or the images produced may be grainy and lack desired contrast.

Currently, there is a need to determine the required X-ray tube voltage and photon count accurately so as to produce a high quality image, while also minimizing the X-ray dose to the subject.

SUMMARY OF THE INVENTION

A system for X-ray fluoroscopic imaging of a subject results in quality images with reduced radiation dosage to a subject by first creating several X-ray images each with an X-ray tube voltage and a different initial photon count $Q_{init}$, determining image intensities and variances by statistical methods based upon assumptions that the images are Poisson images and forming simultaneous equations relating to the intensities and variance of the images. The equations are solved by simultaneous methods to determine constants used in predicting an optimal image intensity that will provide an image of a desired S/N ratio. An optimal photon count $Q_{opt}$ is determined based upon the image intensity, the initial photon count $Q_{init}$, and optimal image intensity, and is employed in creating subsequent images having a desired S/N ratio and having a reduced X-ray dose.

OBJECTS OF THE INVENTION

It is an object of the present invention to minimize X-ray dose in X-ray fluoroscopic imaging by employing statistical methods in approximating X-ray parameters.

It is another object of the invention to provide Poisson images having a desired signal-to-noise ratio using a minimum of X-ray radiation.

BRIEF DESCRIPTION OF THE DRAWINGS

The features of the invention believed to be novel are set forth with particularity in the appended claims. The invention itself, however, both as to organization and method of operation, together with further objects, may best be understood by reference to the following description taken in conjunction with the accompanying drawing in which:

DETAILED DESCRIPTION OF THE INVENTION

The X-ray dose received by a subject during the acquisition of one image is defined by:

$$D = f(U, I_{fil}, \mu)T \qquad (1)$$

where U is the peak X-ray tube voltage in kilovolts, $I_{fil}$ is the X-ray tube filament current in mA, and T is the duration of the X-ray pulse in seconds. The function $f(U, I_{fil}, \mu)$ one that depends on $\mu$, the attenuation coefficient, and is affected by the density and geometry of the object being irradiated, tube voltage, geometry of the X-ray system, and the image detector. The peak tube voltage determines the energy per X-ray photon. The number of photons emitted in a unit area is known as the photon count Q. The photon count is proportional to the duration of the pulse T. The photon count may also be increased by increasing the filament current in a manner determined by calibration of the X-ray tube. In particular, the photon count Q is an increasing function of the X-ray tube filament current $I_{fil}$. The brightness of an image created is proportional to the total photon count Q. In order to image moving structures, the time of exposure may be reduced from seconds to a few milliseconds. Therefore, the filament current must be increased in order to produce an image of sufficient brightness.

The dose a subject receives is related to an exposure R and the amount of radiation absorbed by the subject at a given X-ray energy. With exact total attenuation and geometry unavailable, a maximum exposure $R_{max}$, which corresponds to a maximum photon count $Q_{max}$, is minimized rather than dose. The exposure is proportional to the photon count, where the constant of proportionality $\Phi(E)$ depends on the photon energy, E. In other words, $Q = R\Phi(E)$ where $\Phi(E)$ is a function that may be determined through lookup tables. A graph showing a suitable function $\Phi$ is given on p. 79 of Macovski supra. Pages 78 to 80 of Macovski provide a discussion of the relationship between dose, exposure R and photon count Q.

The X-ray tube voltage range is based on:
(1) The object to be examined; and
(2) contrast range necessary for the diagnosis (for example, an exposure of the "bony thorax" requires 66 KVp in order to diagnose the bone structure, whereas 125 KVp is required if the lung structure is to be diagnosed).

The X-ray tube voltage determines, in connection with other system parameters, the contrast of the image.

Figure 1:
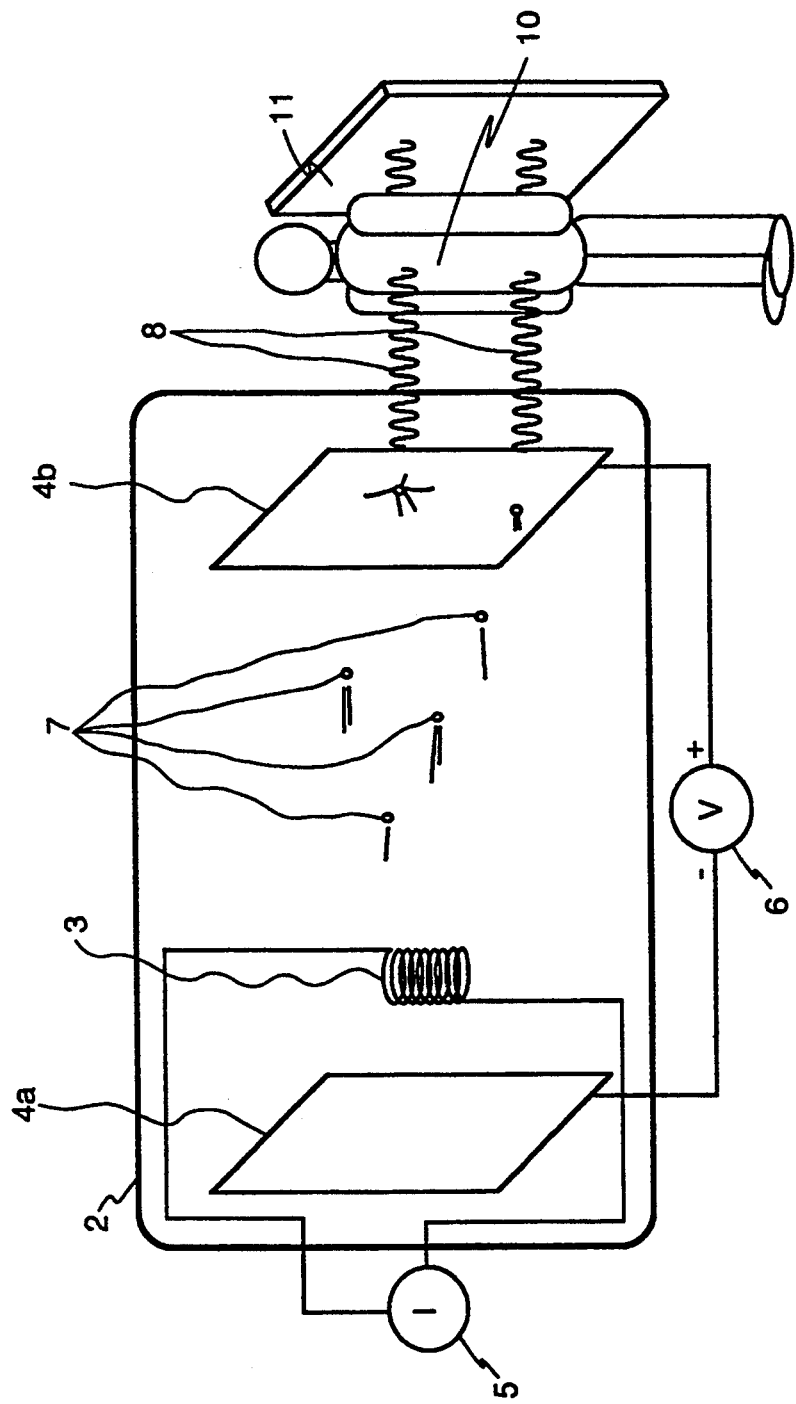
FIG. 1 is a block diagram illustrating the operation of a conventional X-ray system.

FIG. 1. illustrates an X-ray tube comprises a coil 3 and a pair of plates 4a and 4b. A current source 5 provides the filament current, which passes through a coil 3 causing a number of electrons 7 to "boil-off" the coil 3. A voltage source 6 creates a voltage difference between plates 4a and 4b. Electrons 7 are repelled by negatively charged plate 4a to positively charged plate 4b and accelerate at a rate proportional to the voltage difference applied by voltage source 6. Electrons 7 collide with plate 4b and decelerate, causing the kinetic energy of electrons 7 to be translated into electromagnetic photons 8. The energy of each photon, (proportional to the frequency of the electromagnetic radiation), is proportional to the velocity of each electron 7 as it collides with plate 4b. The frequency of the electromagnetic radiation is related to its ability to penetrate material objects. The number of electrons 7 that boil off coil 3 is related to the filament current passing through coil 3. Photons 8 emitted from plate 4b are directed through a subject 10 to be imaged. Photons that pass through subject 10 are then recorded at a recording plane 11. Recording plane 11 may comprise photographic material sensitive to X-rays, or an array sensitive to X-rays, which is used to capture an image.

The image captured at image plane 11 varies with the voltage of voltage source 6 and a filament current applied through coil 3 from current source 5, since each electron that collides with plate 4b creates a photon that passes through subject 10 and illuminates a small portion of image plane 11. The "graininess" of the captured image is related to the photon count Q.

Figure 2:
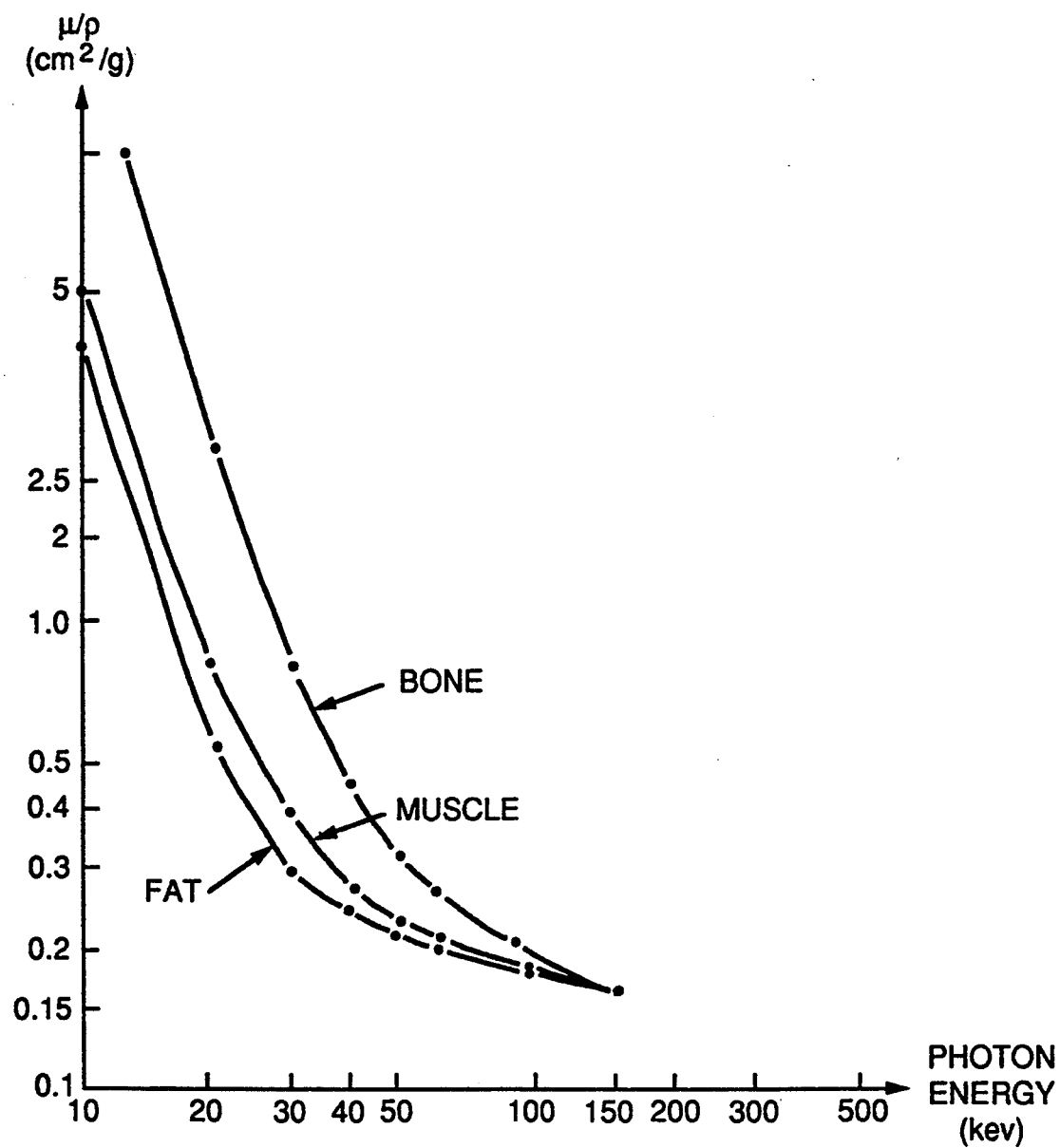
FIG. 2 is a graph of linear X-ray attenuation coefficients vs. X-ray photon energy for muscle, fat and bone.

The difference in attenuation of photons 8 passing through different materials of subject 10 varies with photon energy. This difference in attenuation between materials determines the degree of contrast in the created image. In FIG. 2 the linear X-ray attenuation coefficient for muscle, fat and bone are plotted for varying X-ray photon energy. The difference between the curves at any given photon energy level determines the contrast between materials represented by the curves at that photon energy level. Therefore, in FIG. 1, the contrast of an image acquired at image plane 11 is related to the voltage applied across plates 4a and 4b.

The dose that subject 10 receives is related to the voltage applied across plates 4a and 4b, the current passing through coil 3, and the amount of time during which radiation is transmitted through subject 10.

Figure 3:
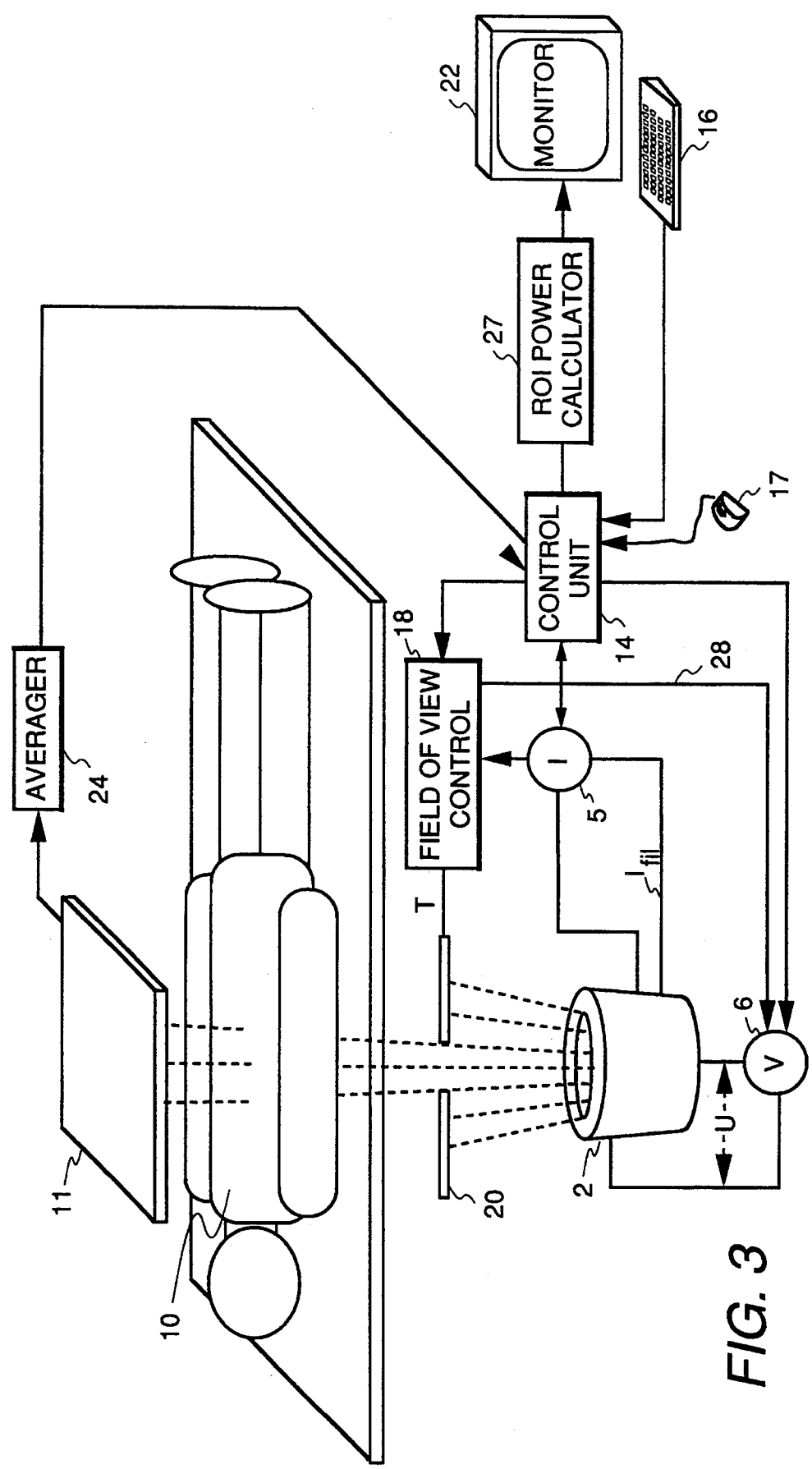
FIG. 3 is a block diagram of a reduced dose X-ray system according to the present invention.

In the X-ray system of FIG. 3 physical information regarding the tissue or organ of a subject 10 to be imaged is provided to a control unit 14 through a keyboard 16, or pointing device 17. The operator provides a minimum acceptable signal-to-noise power ratio $P_S/P_{Nmin}$ in the produced image. Control unit 14 establishes initial values for X-ray tube photon count $Q_{init}$ and a corresponding filament current and X-ray tube voltage $U_{init}$ based upon conventional clinical experience tables for this purpose.

Control unit 14 furnishes a signal to current source 5 causing it to pass a filament current through X-ray tube 2 corresponding to the desired photon count Q. Control unit 14 also furnishes a signal to voltage source 6 causing it to produce a voltage difference across the plates of X-ray tube 2. Control unit 14 also furnishes a signal to a field of view control unit 18, causing a field of view mask 20 to be opened, allowing X-rays from X-ray tube 2 to pass through subject 10 and to image plane 11. Control unit 14 can be controlled to cause current source 5 to pulse the current to control voltage source 6 to pulse the voltage across X-ray tube 2, effectively pulsing the X-ray radiation through subject 10. The signal sensed by image plane 11 is passed to an averager 24 which averages the signal over pulse time T for each point of image plane 11 and provides this signal to control unit 14. Control unit 14 constructs an image which is displayed on a monitor 22.

Each pixel i of the created image is composed of a noise component n and a signal component s, or i=s+n. The signal component s of the image represents the ideal image that would result from an elimination of all noise sources, and the noise component is equal to i−s, the difference between the actual image and the ideal image.

Since s is the expected value of i, it follows that the contributions of the signal power $P_S$ and noise power $P_N$ to the total power $P_I$ add, giving an equation $$P_I = P_N + P_S. \tag{2}$$

The noise power is assumed to be distributed uniformly over the whole of frequency space, whereas the signal power is concentrated in the low frequency components.

Noise is spatially uncorrelated, whereas the signal is correlated. The signal may be modelled as a Markov random field. The noise power can be computed from the image by first performing a unitary transform on the image to create a spectrum composed of components. The unitary transform may be a Fourier, Discrete Cosine, Hadamard, Discrete Sine, Haar or Slant Transform as described in "Fundamentals of Digital Image Processing" by Anil K. Jain, Prentice-Hall, (1989). As described in Jain, the above-mentioned transforms are unitary if the correct scaling factor is used. If another scaling factor is used, then the transforms are no longer unitary in a strict sense, although their essential properties are unchanged. The term "unitary transformation" is used here to mean any unitary transform possibly multiplied by a scaling factor. Throughout the remainder of this description, a Fourier transform is described, but any of the above-mentioned transforms may be used in its place.

The high-frequency components in Fourier space with $F_{ij}$ being the i,jth region, or "bin", in Fourier space of the Fourier transform of the image, are summed to determine the noise power.

Figure 4:
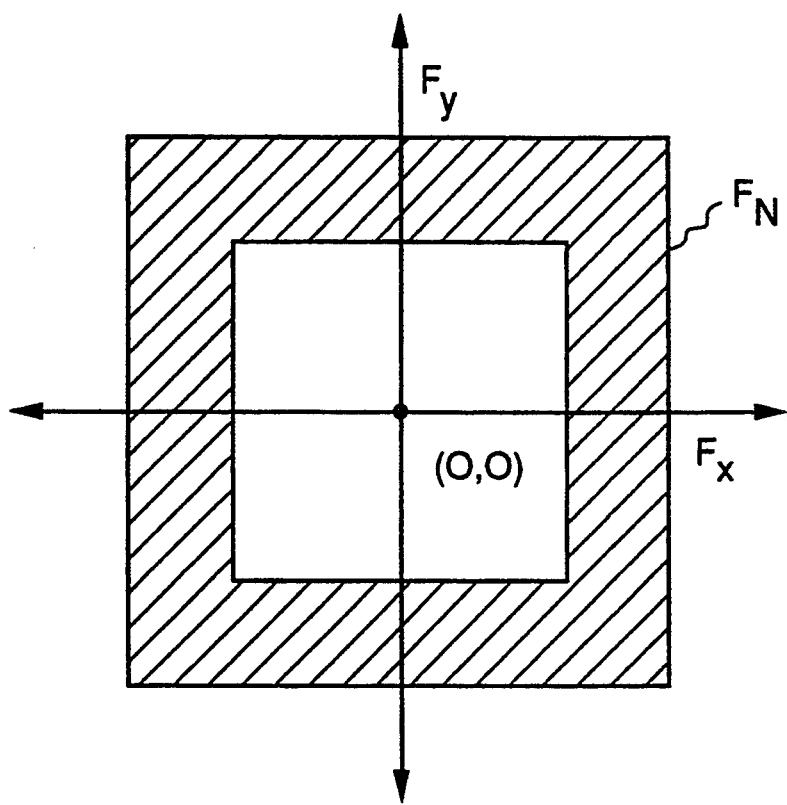
FIG. 4 is a two-dimensional Fourier space representation of estimations of respective noise and signal regions.

FIG. 4 represents a two-dimensional Fourier space with the zero frequency at the center point (0,0). The cross-hatched area represents a suitable choice of high frequency bins on which to sum the noise power. For a 256×256 or 512×512 pixel image the width of the cross-hatched strip may be chosen to equal about 32 frequency bins, though this choice is somewhat arbitrary. This choice has been shown to give good results, however. Let the cross-hatched region be called the Fourier "noise region" and be denoted $F_N$. Let $R_N$ represent the total number of bins in the noise region. Then we can compute the average noise power per bin by the equation:

$$P_N = \left(\frac{1}{R_N}\right) \underset{(i,j)\in F_N}{\Sigma} |F_{ij}|^2 \quad (3)$$

and the average total power per bin by:

$$P_I = \left(\frac{1}{C}\right) \underset{(i,j)}{\Sigma} |F_{ij}|^2 \quad (4)$$

with the summation being over all frequency bins.

By subtracting the noise power from the total power we obtain the signal power per bin. Finally, the signal-to-noise ratio is equal to $$\frac{P_S}{P_N} = \frac{(P_I - P_N)}{P_N}. \quad (5)$$

Often, it will be considered preferable to remove the power contribution due to mean intensity, or DC power, from the signal power, since the DC power in an image is not useful in distinguishing features in the image. This leads to a definition $$P_I' = \frac{1}{C} \underset{(i,j)\neq(0,0)}{\Sigma} |F_{ij}|^2. \quad (6)$$

As before, the ratio is defined as $$\frac{P_S'}{P_N} = \frac{(P_I' - P_N)}{P_N}. \quad (7)$$

According to Parseval's formula, the values $P_I$ and $P_I'$ may be computed directly from the image, instead of in the Fourier domain. In particular, $$P_I = \underset{x,y}{\Sigma} i_{x,y}^2 \quad (8)$$

the sum of squares of image intensity values, and $P'_I$ is C times the variance of $i_{x,y}$:

$$P_I' = C \text{var}(i_{x,y}) = C\sigma^2 \quad (9)$$

Some other unitary transforms, such as the Discrete Cosine Transform (DCT), result in a transformed region defined in the first quadrant (since the DCT has no negative transforms). The noise region would consist of only that part of the noise region in FIG. 4 lying in the first quadrant.

Transform-Based Noise Estimation

The above method works very well for images that contain significant noise. For images with small amounts of noise, however, the noise power $P_N$ does not equal the sum over high-frequency bins $$P_N \neq \left(\frac{1}{R_N}\right) \underset{F_{ij}\in F_N}{\Sigma} |F_{ij}|^2 \quad (10)$$

since significant amounts of signal power will be present even in the high-frequency bins. In fact, for low noise levels, the signal power in the region $F_N$ will outweigh the contribution of noise power, causing a significant overestimate of noise power, and hence a significant underestimate of signal-to-noise ratio. This has been observed in analysis of simulated Poisson images.

A more exact analysis follows. As described correctly above, the power summed over the whole of Fourier space, according to Eqs. (4) or (6) represents the contribution of signal plus noise. This may be written as:

$$P_I = P_N + P_S \quad (11)$$

On the other hand, the summation over the "noise region" $F_N$ cannot be accurately equated with the noise power, since there will be some signal power present in this region. Assume that some fraction $\alpha$ of the total signal power resides in the region $F_N$ of the frequency spectrum. The power estimate given by Eq. (3) is then not quite equal to noise, but to $P_N + \alpha P_S$. This results in a second equation $$\hat{P}_N = P_N + \alpha P_S \quad (12)$$

where $\hat{P}_N$ is the expression on the right of Eq. (10).

The equation corresponding to Eq. (7) then is equal to:

$$\frac{P_I - \hat{P}_N}{\hat{P}_N} = \frac{(1-\alpha)P_S}{P_N + \alpha P_S}. \quad (13)$$

If $\alpha << 1$ and $P_N >> \alpha P_S$, then Eq. 13 correctly gives $P_S/P_N$ as required. However, if $P_N << \alpha P_S$, then this equation reduces to $(1-\alpha)/\alpha$, the ratio of signal power outside $R_N$ to the power in $R_N$, which is not what is required.

Inverting Eq. (13) gives:

$$\frac{\hat{P}_N}{P_I - \hat{P}_N} = \frac{P_N}{P_S}\left(\frac{1}{(1-\alpha)}\right) + \left(\frac{\alpha}{(1-\alpha)}\right). \quad (14)$$

The S/N ratio is assumed to be proportional to the total intensity of the image, $P_S/P_N \approx I$. The intensity is known, or may be measured from the image. The left hand side of Eq. (14) is also dependent upon the intensity, but may be measured from the image. Since $P_N/P_S$ is inversely proportional to I, then:

$$\frac{P_N}{P_S} = \frac{r_0}{I} \quad (15)$$

where $r_0$ is a proportionality constant.

Eq. (14) may then be written as:

$$f(I) = \frac{c_1}{I} + c_2 \quad (16)$$

where $$c_1 = \frac{r_0}{1-\alpha} \text{ and } c_2 = \frac{\alpha}{1-\alpha} \quad (17)$$

and f(I) is the value of $$\frac{\hat{P}_N}{P_I - \hat{P}_N}$$

measured at the given intensity value. The values $c_1$ and $c_2$ are constants, independent of I.

Another way of writing Eq. (16) is:

$$I \cdot f(I) = c_1 + c_2 I. \tag{18}$$

Now given two different images with different intensities, it is possible to solve a pair of linear equations of the form of Eq. (18) to obtain the values of $c_1$ and $c_2$. If more than two images are available, then it is possible to solve a redundant set of equations in two unknowns by a linear least-squares technique to get the values of $c_1$ and $c_2$. Sections 14.0–14.3 of the book "Numerical Recipes in C", by William H. Press, Brian P. Flannery, Saul A. Teukolsky and William T. Vetterling, published by Cambridge University Press, Cambridge, England (1988) provide a good description of linear least squares techniques.

Given $c_1$ and $c_2$ and Eq. (17), $\alpha$ and $r_0$ may be found since:

$$r_0 = \frac{c_1}{1 + c_2} \text{ and } \alpha = \frac{c_2}{1 + c_2}. \tag{19}$$

Once the values of $r_0$ and $\alpha$ have been computed, it is possible to predict the value of $P_S/P_N$ at any other image intensity according to the formula $$\frac{P_S}{P_N} = \frac{I}{r_0}. \tag{20}$$

Alternatively from Eqs. (11 and 12):

$$\frac{P_S}{P_N} = \frac{P_I - \hat{P}_N}{\hat{P}_N - \alpha P_I} \tag{21}$$

If two independent images of an identical scene with the same or nearly equal intensities are available, the present method may still be used. The images may simply be added together pixel by pixel to obtain an image of double the intensity. On an assumption that the original images are Poisson images, the summed image will be a Poisson image.

In solving a set of redundant equations by least-squares techniques, it is important to realize that not all equations should be given the same weight. For instance when solving Eqs. (16) or (18) by least-squares techniques, it is important to weight the measurements from noisy images and relatively noise-free images appropriately, otherwise poor results may be obtained. The optimal weights are equal to the inverse of the standard deviation (square root of variance) of each data measurement. Since it is difficult to estimate the variance of the value f(I) in Eq. (16), suitable weights may be chosen by empirical means. It was found that the choice of equal weights $w_i = 1.0$ in solving equations of the form of Eq. (16) does not give very good results. Far better results are achieved by choosing weights $w_i = I$, where I is the sum of pixel intensity for the i-th image. This is equivalent to multiplying each equation by I, thereby putting the equations in the form of Eq. (18). Other weights that work well are $w_i = I^2$.

Alternative methods for estimating the S/N ratio for the image are based on slightly stronger assumptions about the image. These methods are preferable, when applicable, since they do not require the computation of a Fourier transform of the image.

Two assumptions are made about the image:

The signal power is proportional to the square of the mean intensity:

$$\bar{P}_S = k_1 \left( \sum_{x,y} i_{x,y}/C \right)^2, \text{ and} \tag{22}$$

the noise power is proportional to the mean intensity, $$\bar{P}_N = k_2 \sum_{x,y} i_{x,y}/C \tag{23}$$

where $k_1$ and $k_2$ are proportionality constants. In addition:

$$\bar{P}_S + \bar{P}_N = \sum_{x,y} i_{x,y}^2/C \tag{24}$$

or, alternatively, if the DC power is not included in the signal:

$$\bar{P}_S + \bar{P}_N = \sum_{x,y} i_{x,y}^2/C - \left( \sum_{x,y} i_{x,y}/C \right)^2 = \text{var}(i_{x,y}) = \sigma^2 \tag{25}$$

where C is the total number of pixels in the image, $i_{x,y}$ is the pixel with coordinates (x,y) and the sums are over all pixels in the image. The bars over $\bar{P}_S$ and $\bar{P}_N$ indicate average power per pixel. For convenience, Eq. (25) is chosen to represent the total power, but the following discussion will apply equally well to (24) with trivial alterations.

Denoting:

$$\bar{I} = \frac{1}{C} \sum_{x,y} i_{x,y} \tag{26}$$

as the mean pixel value, and $$\sigma^2 = \frac{1}{C} \sum_{x,y} i_{x,y}^2 - \left( \frac{1}{C} \sum_{x,y} i_{x,y} \right)^2 \tag{27}$$

as the variance of pixel values, Eqs. (22, 23 and 24) may be combined to obtain:

$$k_1 \bar{I}^2 + k_2 \bar{I} = \sigma^2. \tag{28}$$

Since $\bar{I}$ and $\sigma^2$ may be computed from the image, this gives a single linear equation in $k_1$ and $k_2$. Two or more such equations may be solved for $k_1$ and $k_2$. Then for a given intensity, $\bar{I}$:

$$\frac{P_S}{P_N} = \bar{I} \frac{k_1}{k_2}. \tag{29}$$

In solving a redundant set of equations of the form of Eq. (28) appropriate weights must be chosen. It may be computed that the variance of $\sigma^2$ as defined by (Eq. 27) is proportional to $\bar{I}^3$ plus lower order terms in $\bar{I}$. For this reason, each equation of the form of Eq. (28) should be weighted by a weight $\bar{I}^{-3/2}$. This is equivalent to solving the equation $$k_1 \bar{I}^{\frac{1}{2}} + K_2 \bar{I}^{-\frac{1}{2}} = \sigma^2 \bar{I}^{-3/2}. \tag{30}$$

Poisson Images

For true Poisson images, the situation is even more favorable. In fact, in this case a simple method of estimating the signal-to-noise ratio employs a single image.

For Poisson images, it may be shown that the average noise power $\bar{P}_N$ is equal to the mean pixel value. In other words, the constant $k_2$ in Eq. (28) is equal to 1. This means that it is possible to compute $P_S/P_N$ from a single image, since there is only one unknown. The resultant formula is:

$$\frac{P_S}{P_N} = \frac{\sigma^2 - \bar{I}}{\bar{I}}. \tag{31}$$

It is possible to take advantage of the methods used here to make an efficient search for the optimal photon count at any given tube voltage U.

The photon count Q is proportional to the total image intensity I. The constant of proportionality is dependent on the voltage U and the view (of the subject). However, once an image is taken, the exact relationship being the proportionality constant of Q to I may be determined. This allows the photon count Q required to create another image with a given intensity I to be computed easily.

Transform Based Methods.

Figure 5:
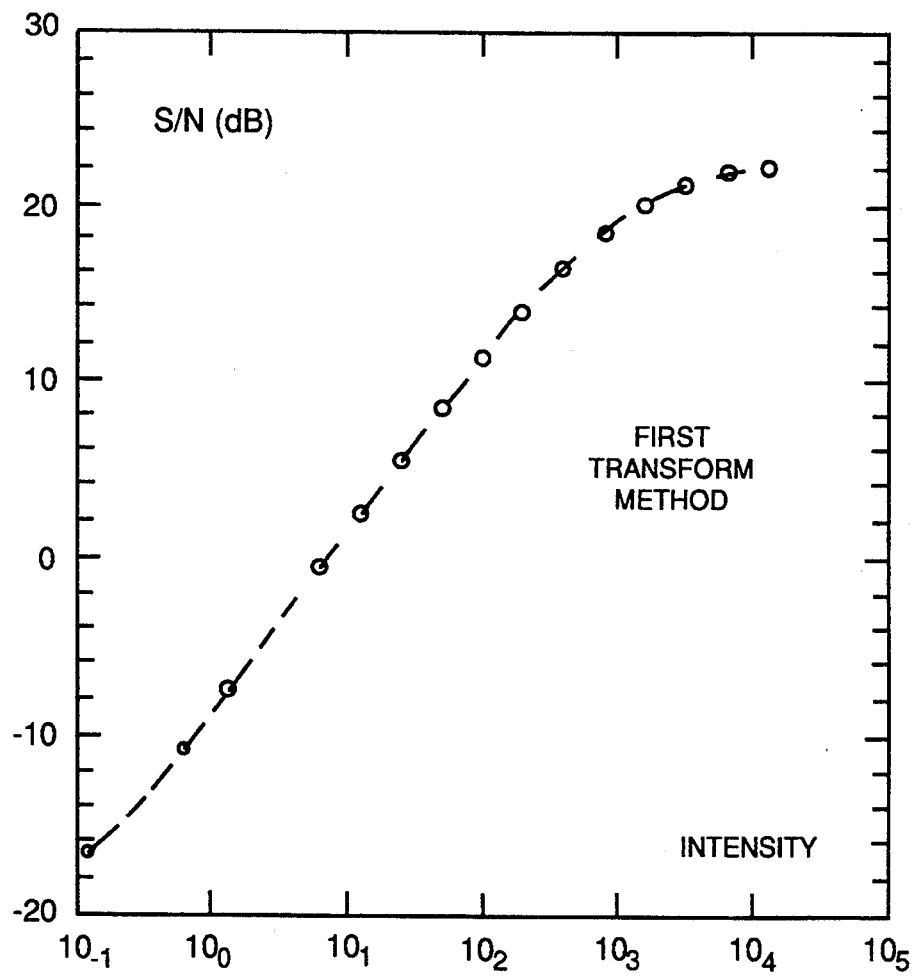
FIG. 5 is a graph of signal-to-noise ratio vs. mean pixel intensity as calculated by the first Fourier method.

Referring to FIG. 5, it can be seen that when the noise level is high (of the order of 10 dB or less) the estimates of S/N ratio computed using Eqs. (3), (4) and (5) (circles) are very close to the correct values computed using the straight line. Thus Eqs. (3), (4) and (5) estimate $P_S/P_N$ at a relatively high noise level. This provides a first method for computing $Q_{opt}$.

First: Transform Method
1) Create an image;
2) compute $P_S/P_N$ according to Eqs. (3), (4) and (5) at a low signal-to-noise ratio level;
3) compute the image intensity I required to achieve the desired S/N ratio; and
4) compute required photon count, $Q_{opt}$ from the optimal image intensity.

Since extrapolation over several orders of magnitude of image intensity may be inexact, taking two or more images may provide a more exact method.

Second Transform Method
1) Create two or more images at different intensity levels;
2) solve equations of the form of Eq. (18) (by least squares method if more than two images) for $c_1$ and $c_2$;
3) compute parameter r0 using Eq. (19);
4) solve Eq. (20) to obtain the image intensity required to form an image with the desired signal-to-noise ratio; and
5) calculate a required photon count, $Q_{opt}$ from the optimal image intensity.

A more precise choice of intensity levels is as follows:
Third Transform Method
1) Create a first image with a given photon count $Q_{init}$
2) obtain an estimate of $Q_{opt}$ using steps "1"–"4" of the first Transform method.
3) form a second image with photon count equal to the estimated value of $Q_{opt}$;
4) Solve Eqs. (18) and Eq. (19) to obtain the value of parameter r0;
5) solve Eq. (20) to result in the image intensity required to form an image with the desired signal-to-noise ratio; and
6) recalculate the required photon count, $Q_{opt}$ from the optimal image intensity.

The second image should have signal-to-noise ratio close to the required value and any remaining correction may be computed with some accuracy.

Statistical Methods

Similar methods apply to the statistical techniques. If the image is known to be a Poisson image (a fair assumption for X-ray images) then Eq. (31) allows the signal-to-noise ratio to be computed from a single high noise image.

First Statistical Method
1) Compute $P_S/P_N$ from a single image using Eq. (31); and
2) compute the value of I required to give the required signal-to-noise ratio assuming that $P_S/P_N$ is proportional to I.

If the image is truly a Poisson image, then the results of this method are accurate. However, under weaker assumptions, two or more images may be employed to produce an estimate.

Second Statistical Method
1) Create two of more images at different intensity levels
2) solve equations of the form of Eq. (30) (by least-squares methods if more than two images) to obtain the values of $k_1$ and $k_2$.
3) Solve Eq. (29) to compute the value of $\bar{I}$ required to achieve the desired signal-to-noise ratio.

The second statistical method may also be used in cases where the image is known to be a Poisson image by solving Eq. (30) under the additional assumption that $k_2=1$.

A specific choice of intensity levels may be made as in the following method.

Third Statistical Method
1) Create an image;
2) obtain a first estimate of $Q_{opt}$ using steps "1"–"2" of the first statistical method;
3) form a second image with photon count equal to the estimated value of $Q_{opt}$;
4) Compute average intensity $\bar{I}$ and variance for both images using Eqs. (26) and (27);
5) form simultaneous equations according to Eq. (30);
6) solve simultaneous equations to obtain the values of $k_1$ and $k_2$; and
7) solve Eq. (29) to compute the value of $\bar{I}_{opt}$ required to achieve the desired signal-to-noise ratio.

The resulting images will have acceptable quality and will be produced while minimizing the X-ray dosage to the subject.

In order to test the methods described here, simulation was performed on artificially degraded Poisson images.

Figure 6:
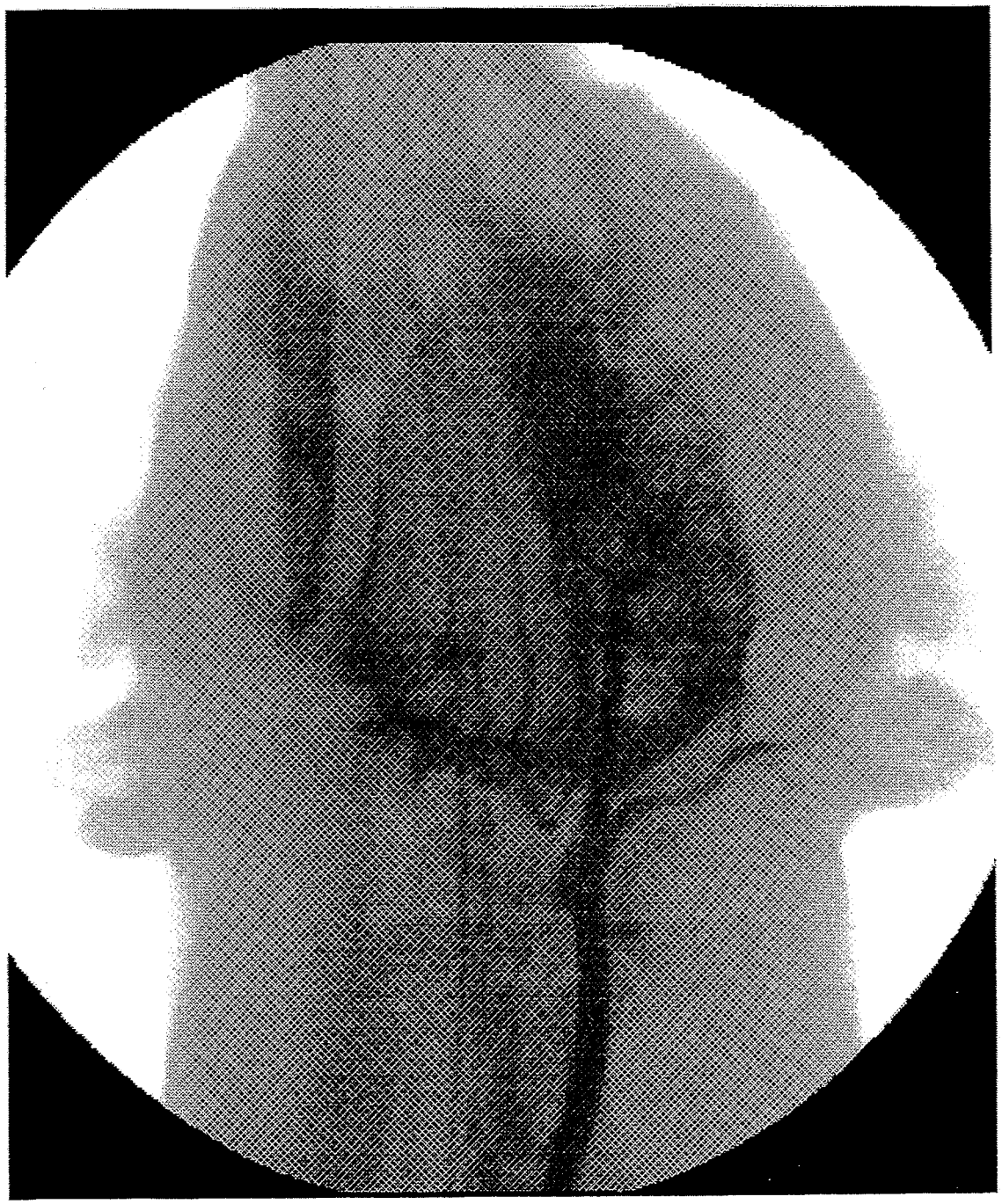
FIG. 6 shows an original image used in simulations.

FIG. 6 shows an original image that was employed in producing Poisson images with varying degrees of Poisson noise. More specifically, suppose $\xi_{xy}$ represents the pixel value at position (x,y) in the original image. Let $\beta$ be a real number greater than 0. A new image was created with pixel values $i_{xy}$ where for each (x,y) the value $i_{xy}$ is a sample from a Poisson random distribution with mean $\beta\xi_{xy}$. A number of such images were created with different values of $\beta$ so that the signal-to-noise ratio of the resulting images ranged from about $-16.8$ dB to 33 dB.

Figure 7:
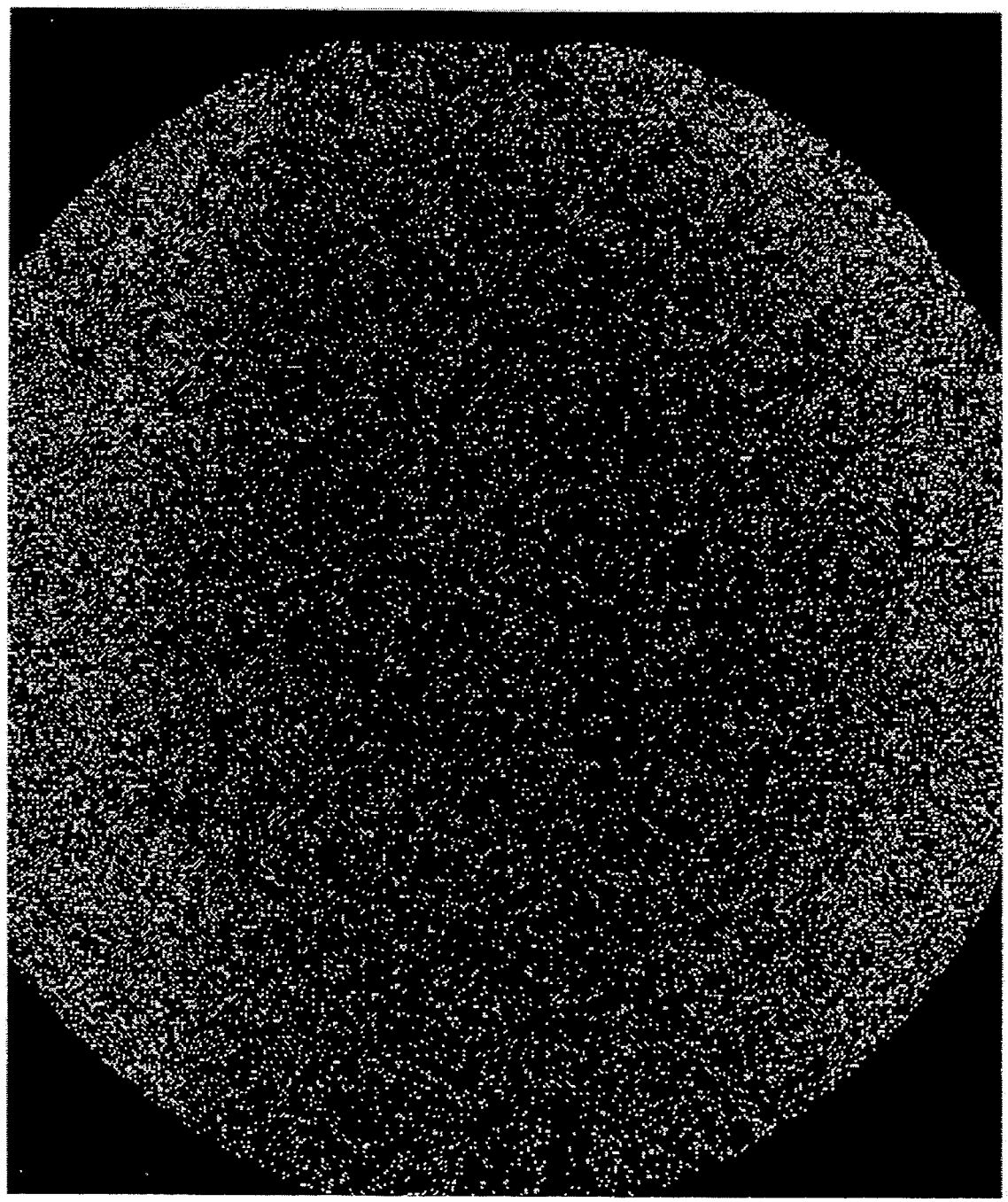
FIG. 7 is a degraded Poisson image with signal-to-noise ratio $P_S'/P_N = -16.8$ dB created from FIG. 6.
Figure 8:
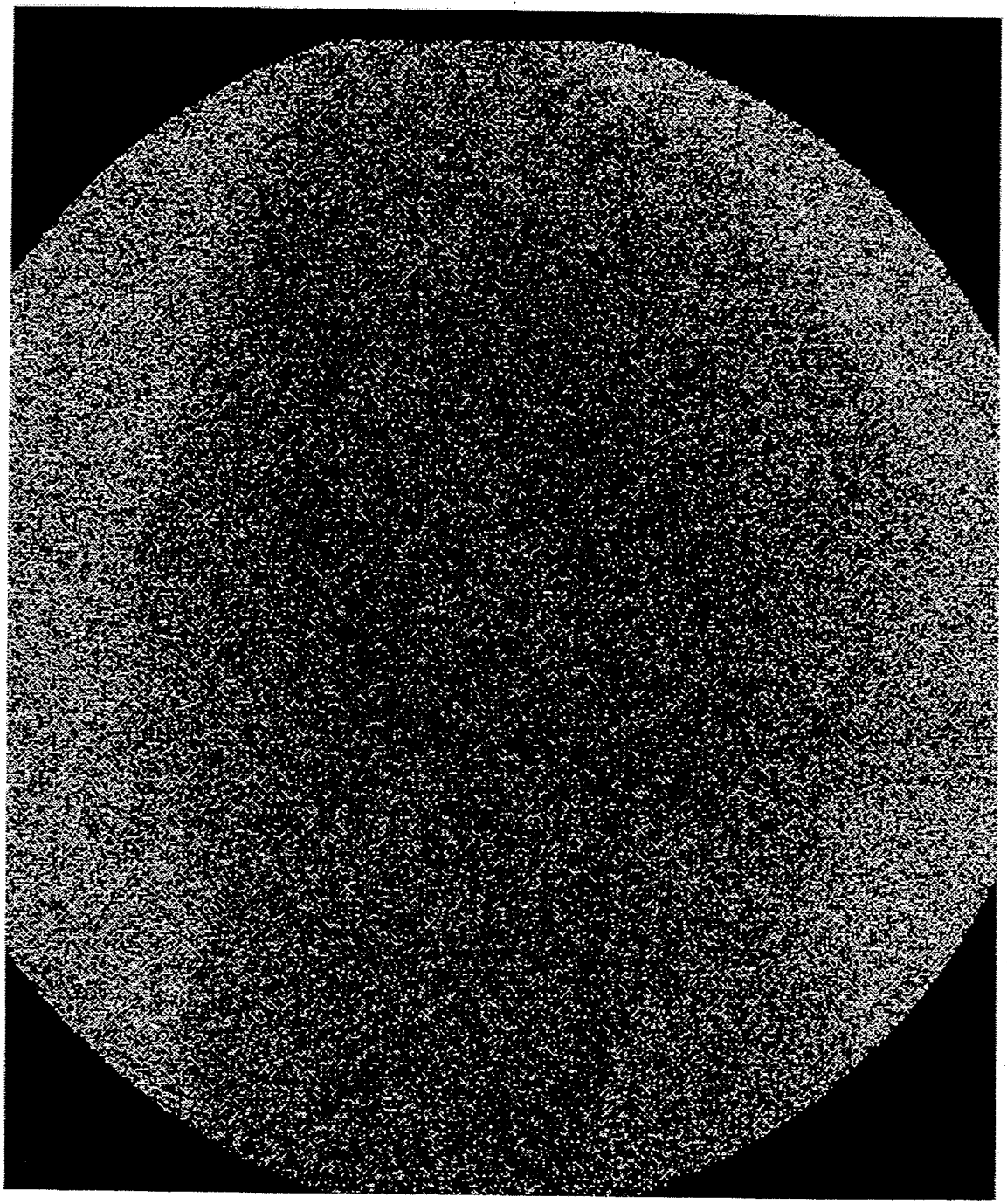
FIG. 8 is a degraded Poisson image with $P_S'/P_N = -10.4$ dB created from FIG. 6.
Figure 9:
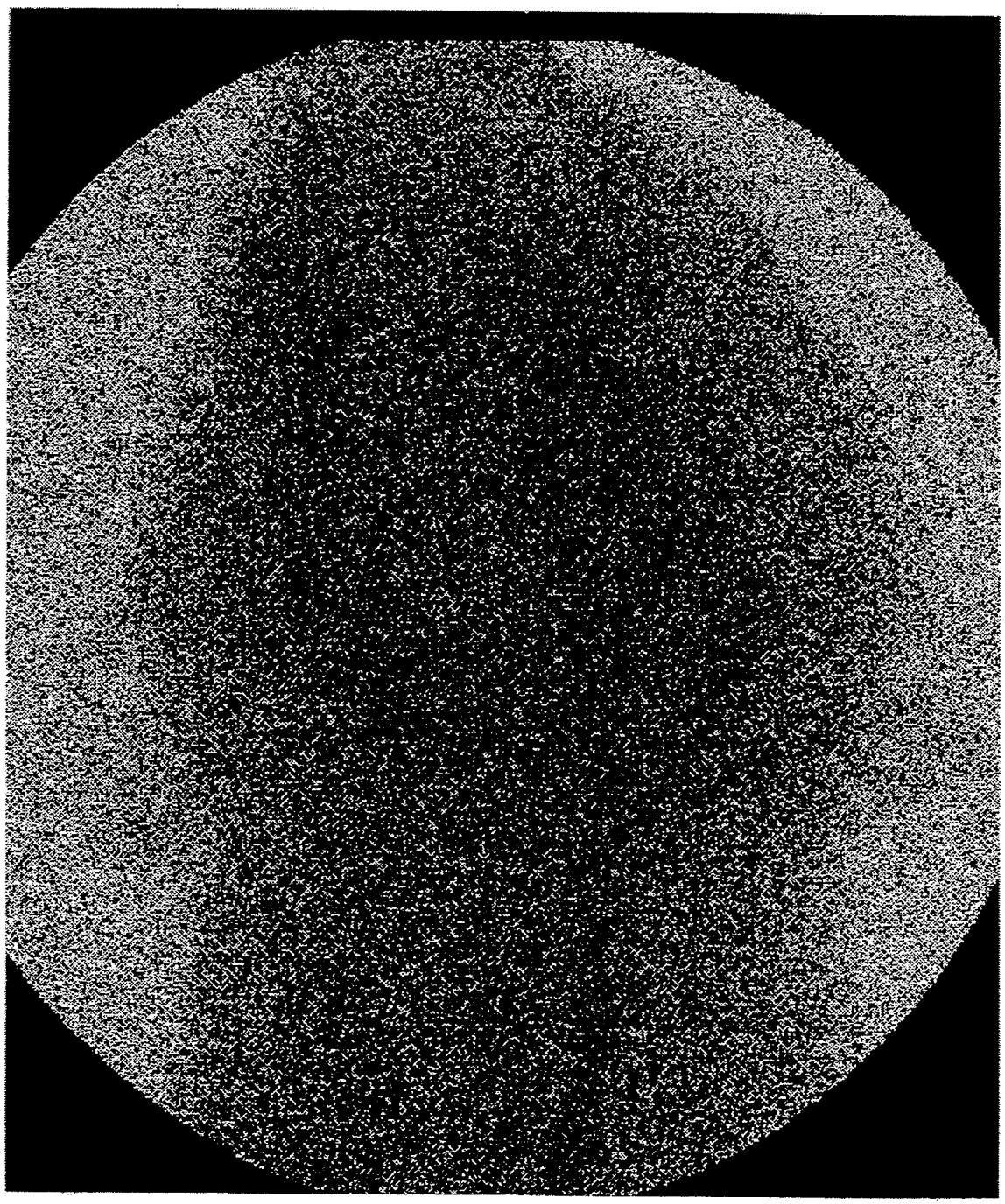
FIG. 9 is a degraded Poisson image with $P_S'/P_N = -7.3$ dB created from FIG. 6.
Figure 10:
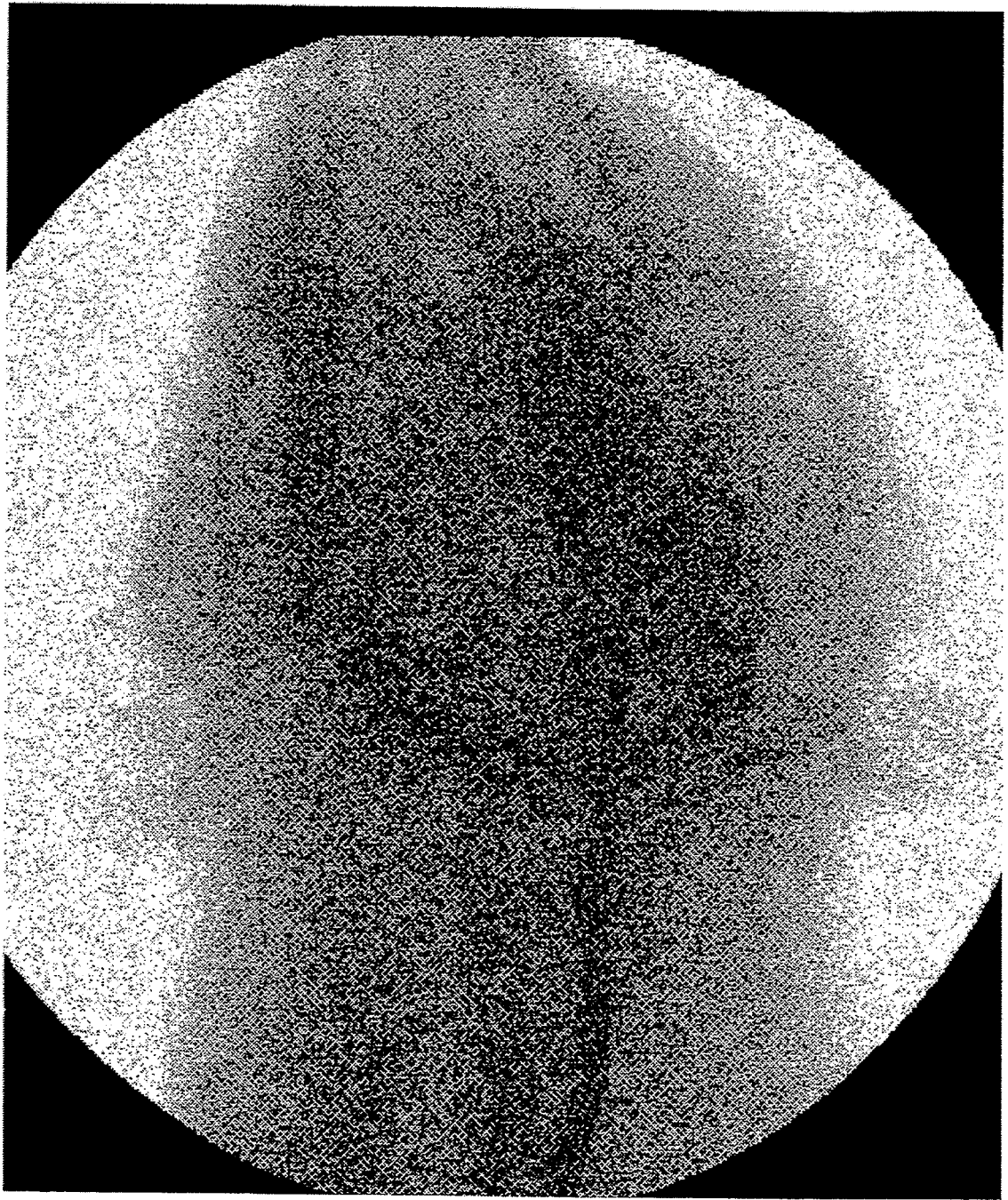
FIG. 10 is a degraded Poisson image with $P_S'/P_N = -0.3$ dB created from FIG. 6.
Figure 11:
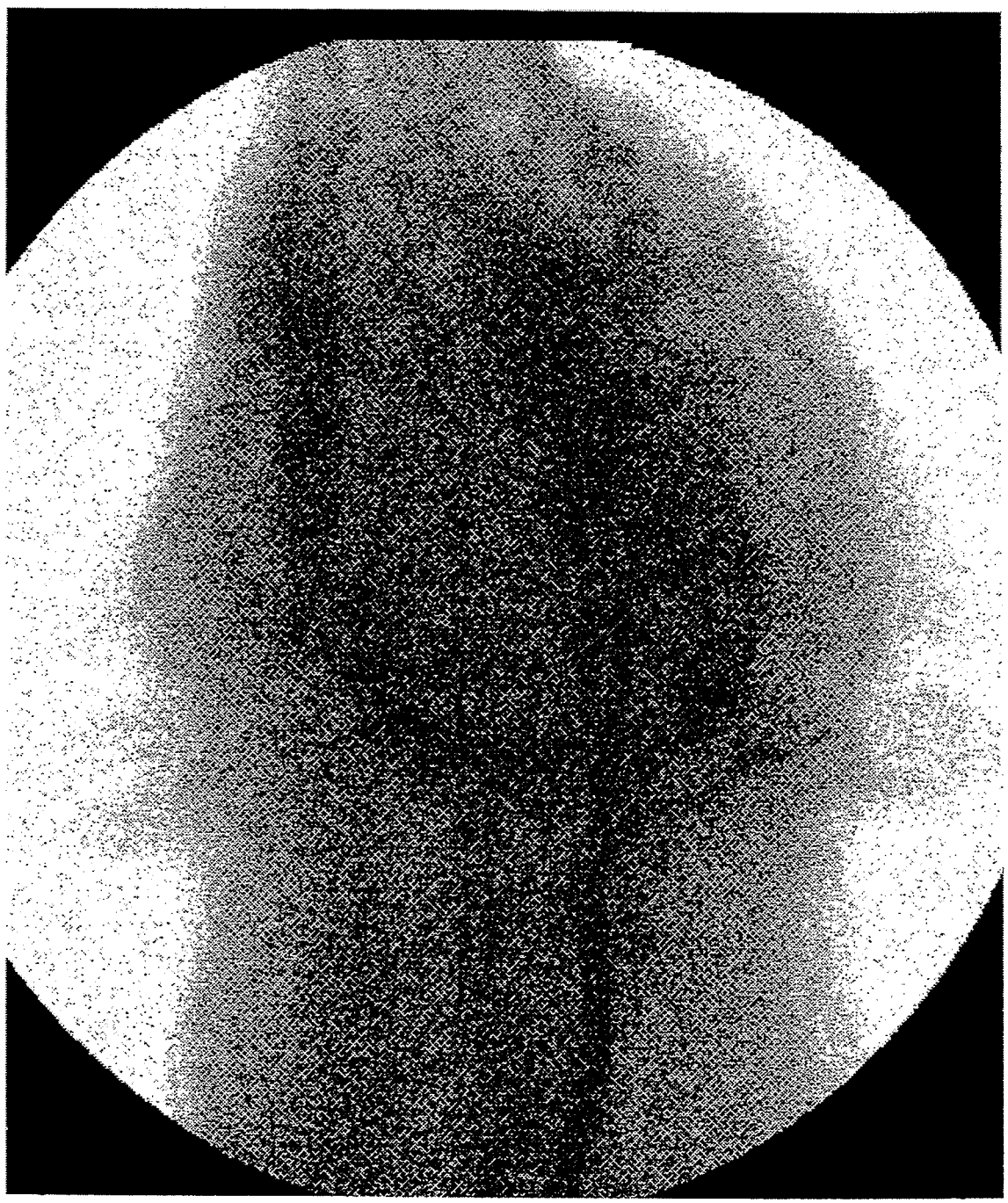
FIG. 11 is a degraded Poisson image with $P_S'/P_N = 2.7$ dB created from FIG. 6.

FIG. 7 is a Poisson image created from that of FIG. 6, with $P_S'/P_N = -16.8$ dB. This was the noisiest image used in the simulation. FIGS. 8–11 are similar Poisson images with S/N ratios of $-10.4$ dB, $-7.3$ dB, $-0.3$ dB and 2.7 dB, respectively.

FIGS. 5, 12, 13 and 14 are plots showing the results of applying the various method described above to FIGS. 8–11 and additional images. In these plots, the signal-to-noise ratio $P_S'/P_N$ is computed with the DC power not included in the signal power. The horizontal axis represents the mean pixel value $\bar{I}$, measured in counts per pixel plotted on a logarithmic scale. The vertical axis represents the signal-to-noise ratio in decibels. The lowest quality image has approximately $10^{-1}$ counts per pixel and the highest quality image approximately $10^4$ counts per pixel.

FIG. 5 shows the result of the first transform method. This shows that the estimate, although linear for high noise images, falls off asymptotically for low noise to a value $(1-\alpha)/\alpha$ as predicted.

Figure 12:
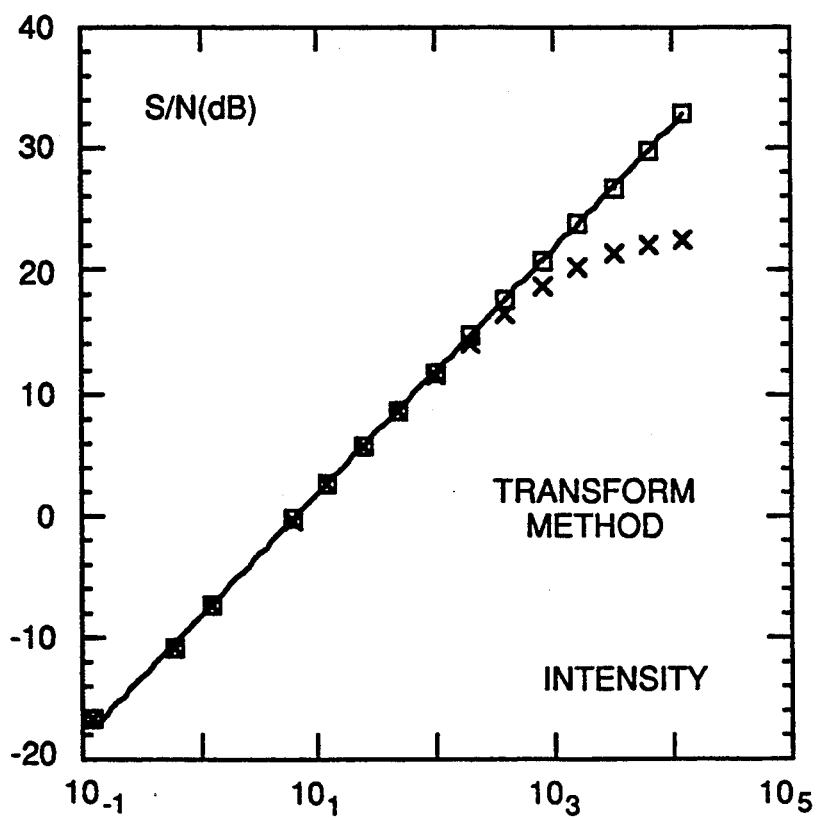
FIG. 12 is a graph of signal-to-noise ratio vs. mean pixel intensity as calculated by the second transform method also having the graph of FIG. 5 superimposed upon it.

FIG. 12 shows the result of applying the second transform method. The values of $P_I$ and $P_N$ were computed for all the images. A least squares solution to Eq. (18) was computed and the values of $r_0$ and $\alpha$ were computed using Eq. (19). For each intensity, the value of $P_S'/P_N$ was computed and plotted (squares). The points are shown fitted to the line given by $P_S'/P_N = I/r_0$. As is apparent the fit is very good. The points of FIG. 5 are also superimposed (small crosses) on FIG. 12 to show how they deviate from the correct values.

Figure 13:
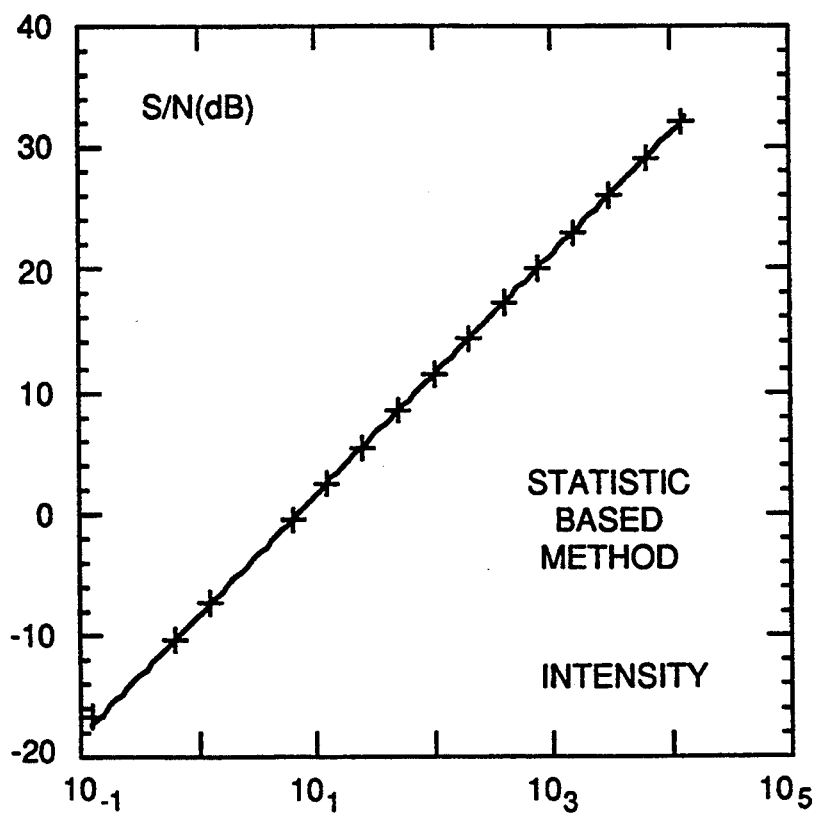
FIG. 13 is a graph of signal-to-noise ratio vs. mean pixel intensity as calculated by the second statistical method.

FIG. 13 shows the results of the second statistical method as applied to the set of images. A least squares solution to Eq. (30) was found. The value of $k_2$ was found to equal approximately 1.001, almost exactly equal to the theoretical value of 1 for Poisson images. This is not surprising, since the images were generated using a Poisson random number generator. The signal-to-noise ratio was plotted in FIG. 13 using Eq. (29) to compute the S/N ratio. As seen, the points fit almost exactly to a straight line.

Figure 14:
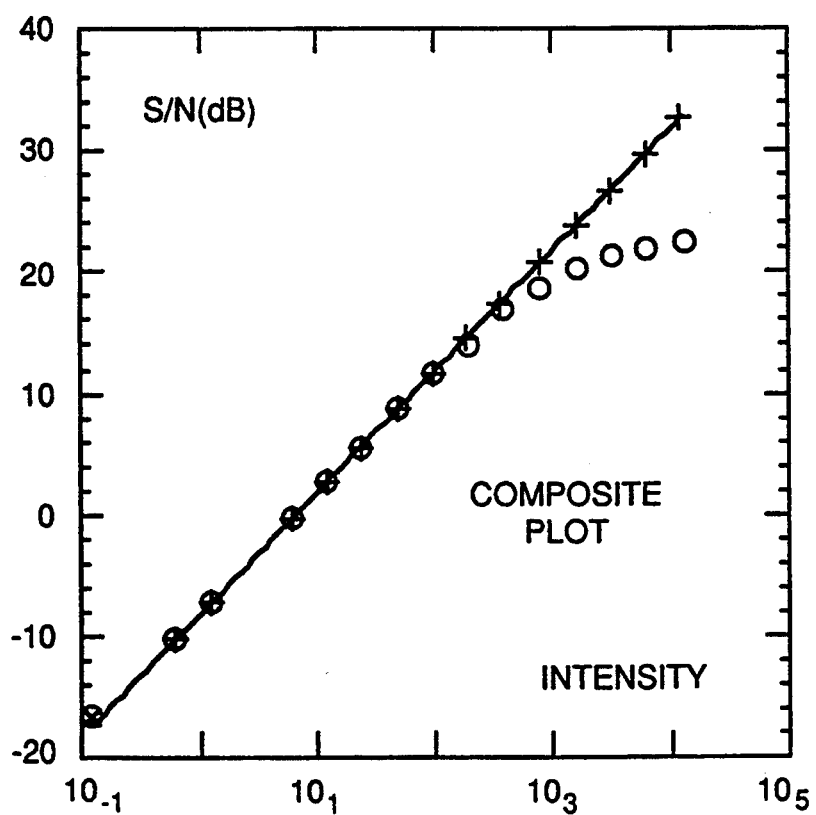
FIG. 14 is a graph obtained by superimposing FIG. 12 on FIG. 13.

FIG. 14 shows FIG. 12 superimposed upon FIG. 13. This shows the difference between the results of the two methods. For almost all points, the values of $P_S'/P_N$ are indistinguishable as computed by the second transform method as compared to the second statistical method.

While several presently preferred embodiments of the invention have been described in detail herein, many modifications and variations will now become apparent to those skilled in the art. It is, therefore, to be understood that the appended claims are intended to cover all such modifications and variations as fall within the true spirit of the invention.

What is claimed is:

1. A method of reduced dose X-ray imaging of a subject comprises the steps of:

a) selecting a minimum signal-to-noise $(P_S/P_{Nmin})$ ratio;

b) creating an X-ray image with an initial photon count $Q_{init}$ and X-ray tube voltage U;

c) determining an average image intensity $\bar{I}$ from the image according to the equation:

$$\bar{I} = \frac{1}{C} \sum_{(x,y)} i_{x,y}$$

where C is the total number of pixels in the image and $i_{x,y}$ is the pixels with coordinates (x,y);

d) determining a variance $\sigma^2$ from the image according to the equation:

$$\sigma^2 = \frac{1}{C} \sum_{(x,y)} i_{x,y}^2 - \left( \frac{1}{C} \sum_{(x,y)} i_{x,y} \right)^2;$$

e) determining $P_S/P_N$ from the image according to the following equation:

$$\frac{P_S}{P_N} = \frac{\sigma^2 - \bar{I}}{\bar{I}};$$

f) determining the value of $I_{opt}$ required to produce an image with a signal-to-noise ratio at least as great as $P_S/P_{Nmin}$ assuming that $P_S/P_N$ is proportional to $\bar{I}$ according to:

$$\bar{I}_{opt} = \left( \frac{P_S/P_{Nmin}}{P_S/P_N} \right) \bar{I};$$

h) determining an optimal photon count $Q_{opt}$ required to produce an image with intensity $\bar{I}_{opt}$; and i) creating subsequent images with the same X-ray voltage U and the optimal photon count $Q_{opt}$ having a signal-to-noise ratio at least as great as $P_S/P_{Nmin}$ and with a reduced X-ray dose.

2. A method of reduced dose X-ray imaging of a subject comprises the steps of:

a) selecting a minimum signal-to-noise ratio $(P_S/P_{Nmin})$;

b) setting a photon count Q to a value $Q_{init}$;

c) creating an x-ray image with a photon count Q and X-ray tube voltage U;

d) determining an average image intensity $\bar{I}$ from the image according to:

$$\bar{I} = \frac{1}{C} \sum_{(x,y)} i_{x,y};$$

where C is the total number of pixels in the image and $i_{x,y}$ is the pixels with coordinates (x,y);

e) determining a variance $\sigma^2$ of the image according to:

$$\sigma^2 = \frac{1}{C} \sum_{(x,y)} i_{x,y}^2 - \left( \frac{1}{C} \sum_{(x,y)} i_{x,y} \right)^2;$$

f) creating an equation proportionality constants for $k_1$ and $k_2$ of the form:

$$k_1 \bar{I}^{\frac{1}{2}} + k_2 I^{-\frac{1}{2}} = \sigma^2 \bar{I}^{-3/2};$$

g) repeating steps "c"–"f" for several images of differing intensity;

h) solving the equations of step f by simultaneous methods to acquire $k_1$ and $k_2$;

i) determining $P_S/P_N$ according to the following equation:

$$\frac{P_S}{P_N} = \bar{I}\frac{k_1}{k_2};$$

j) determining an optimum image intensity $\bar{I}_{opt}$ required to form an image with a signal-to-noise ratio greater than $P_S/P_{Nmin}$ according to the following equation:

$$\bar{I}_{opt} = \left(\frac{P_S/P_{Nmin}}{P_S/P_N}\right)\bar{I};$$

k) determining an optimal photon count, $Q_{opt}$ necessary to produce an image with image intensity $I_{opt}$, based upon the observed relationship between image intensity $\bar{Y}$ and photon count Q, equal to $Q_{init}$; and l) creating subsequent images with the same X-ray voltage and the optimal photon count $Q_{opt}$ having a S/N ratio at least as great as the $P_S/P_{Nmin}$ and with a reduced X-ray dose.

3. A method of reduced dose X-ray imaging of a subject comprises the steps of:
  a) selecting a minimum signal-to-noise ($P_S/P_{Nmin}$) ratio;
  b) creating a first X-ray image with an initial photon count $Q_{init}$ and X-ray tube voltage U;
  c) determining an initial average image intensity $\bar{I}=\bar{I}_{init}$ of the first image according to the equation:

$$\bar{I} = \frac{1}{C} \sum_{(x,y)} i_{x,y},$$

where C is a number of pixels in the image, and $i_{x,y}$ is a pixel intensity at an image location x,y, with the summation covering all pixel locations;
  d) determining a variance $\sigma^2$ from the image according to the equation:

$$\sigma^2 = \frac{1}{C} \sum_{(x,y)} i^2_{x,y} - \left(\frac{1}{C} \sum_{(x,y)} i_{x,y}\right)^2;$$

e) determining $P_S/P_N$ from the image according to the following equation:

$$\frac{P_S}{P_N} \frac{\sigma^2 - \bar{I}}{\bar{I}};$$

f) determining an initial estimated value of $\bar{I}_{opt}$ required to produce an image with a signal-to-noise ratio at least as great as $P_S/P_{Nmin}$ assuming that $P_S/P_N$ is proportional to $\bar{I}$ according to:

$$\bar{I}_{opt} = \left(\frac{P_S/P_{Nmin}}{P_S/P_N}\right)\bar{I};$$

g) determining an optimal photon count $Q_{opt}$ based upon the optimal image intensity $\bar{I}_{opt}$;
  h) creating a second image with the same X-ray voltage U and the optimal photon count $Q_{opt}$;
  i) determining an average image intensity $\bar{i}$ of the second image according to:

$$\bar{I} = \frac{1}{C} \sum_{(x,y)} i_{x,y};$$

j) determining a variance of the second image according to:

$$\sigma^2 = \frac{1}{C} \sum_{(x,y)} i^2_{x,y} - \left(\frac{1}{C} \sum_{(x,y)} i_{x,y}\right)^2;$$

k) creating an equation for proportionality constants $k_1$ and $k_2$ for each of the first and second images according to the equation:

$$k_1\bar{I}^2 + k_2\bar{I}^{-\frac{1}{2}} = \sigma^2\bar{I}^{-3/2};$$

l) solving the equations of step k by simultaneous methods to acquire $k_1$ and $K_2$;
  m) solving, to obtain a second estimate of the optimum image intensity $\bar{I}_{opt}$ required to form an image with a signal-to-noise ratio greater than $P_S/P_{Nmin}$, the equation:

$$\bar{I}_{opt} = \left(\frac{P_S/P_{Nmin}}{k_1/k_2}\right);$$

n) determining an optimal photon count, $Q_{opt}$ required to produce an image with intensity $\bar{I}_{opt}$; and
  o) creating subsequent images with the same X-ray voltage and the optimal photon count $Q_{opt}$ having a S/N ratio at least as great as $P_S/P_{Nmin}$ and with a reduced X-ray dose.

* * * * *